UNITED STATES PATENT OFFICE.

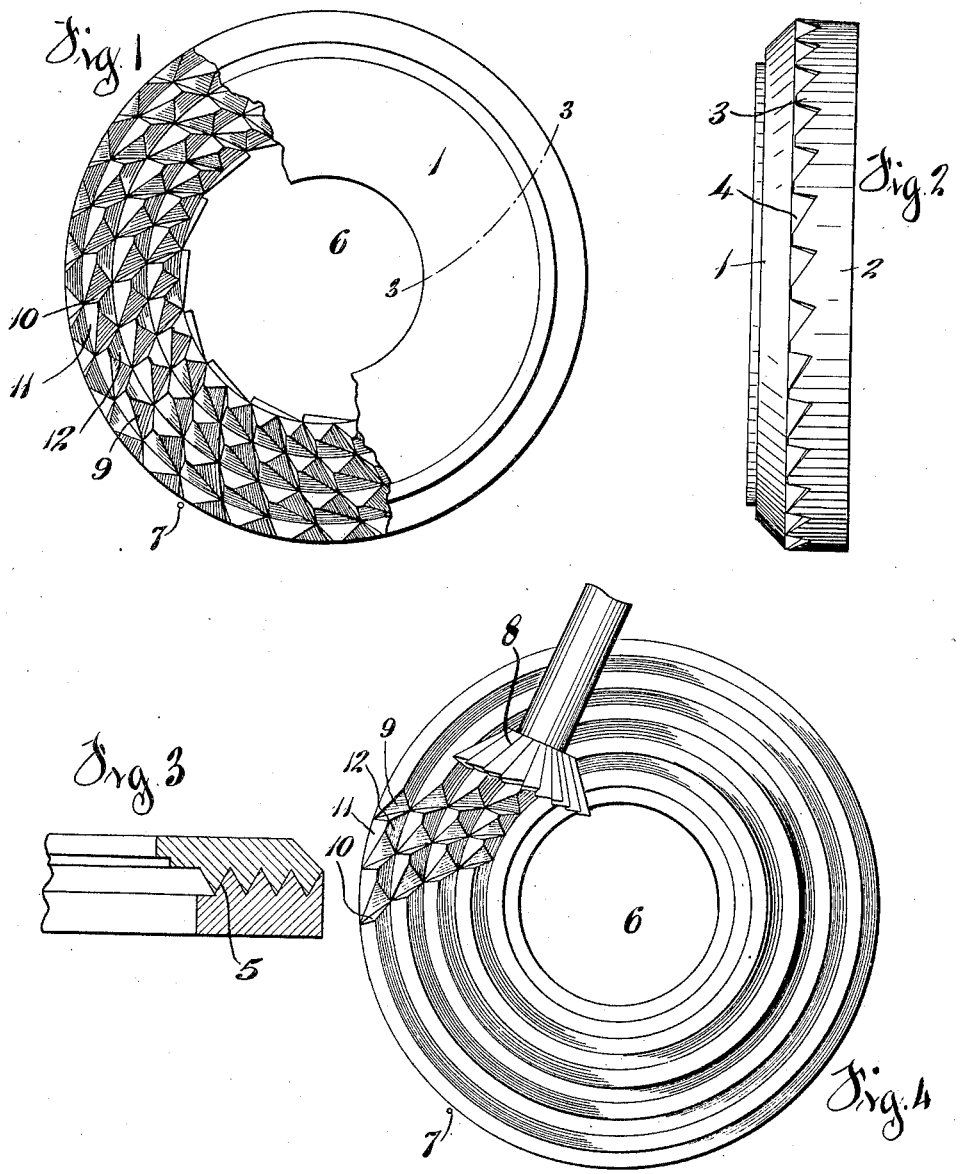

HERBERT L. JOHNSTON, OF TROY, OHIO, ASSIGNOR TO THE HOBART ELECTRIC MANUFACTURING COMPANY, OF TROY, OHIO, A CORPORATION OF OHIO.

GRINDING-DISK FOR COFFEE-MILLS AND THE LIKE.

1,089,413.  Specification of Letters Patent.  Patented Mar. 10, 1914.

Application filed May 22, 1911. Serial No. 628,789.

*To all whom it may concern:*

Be it known that I, HERBERT L. JOHNSTON, a citizen of the United States, and a resident of the city of Troy, in the county of Miami and State of Ohio, have invented certain new and useful Improvements in Grinding-Disks for Coffee-Mills and the like, of which the following is a full, clear, and exact description, reference being had to the accompanying drawing, forming a part of this specification.

The object of my invention is to provide a pair of coöperating disks or burs for the grinding mills for coffee and the like, in which the teeth in each concentric row therefor are of uniform size, with the teeth gradually increasing in size for each radial row, whereby very effective grinding surfaces are provided, and at the same time the cost of manufacture is greatly cheapened, in that the teeth can be formed without the necessity of repeated adjustments necessary for the cutting of burs as ordinarily constructed.

In the drawing, Figure 1 is a plan view of the grinding disks, with one of the disks broken away. Fig. 2 is a side elevation of the same. Fig. 3 is a cross section on the lines 3, 3, of Fig. 1. Fig. 4 is a plan view of one of the disks, illustrating the method of cutting the teeth.

1 represents one of the disks, and 2 the companion disk, between which the material to be ground is passed. The two disks are provided with concentric rows of grinding teeth 3, 4, respectively, so that when the disks are placed together with the teeth intermeshing, the side faces of the teeth of one disk will form cutting and grinding surfaces with the corresponding teeth of the other disk. The construction and shape of the teeth are determined by the method of cutting the same.

The blanks upon which the teeth are to be cut are first turned on a lathe, with a series of concentric V-shaped grooves 5, 5, as shown in Fig. 3. The blank is then secured on the dividing head of the milling machine on an eccentric plate, so that the plate can be indexed on the center 6 of the blank, and so that the blank to be cut can be swung on a center indicated at 7. The milling cutter is indicated at 8 in Fig. 4, and this milling cutter rotates in fixed position in the milling machine, while the work is swung in contact therewith on the center 7, and a transverse V-shaped groove is cut across the concentric V-grooves in the arc of a circle, of which the center is indicated at 7. When one of these transverse grooves is thus cut, the disk is indexed for the next transverse cut on the center 6, and the cutting is proceeded with until all of the transverse grooves are formed for the entire circular face of the disk. By thus cutting the teeth, each tooth of any concentric row is of exactly the same shape as all the other teeth in said row, and formed with an inclined V-shaped face 9 and an abrupt V-shaped face 10, with similar side faces 11 and 12. With this method of cutting the teeth, the teeth gradually increase in size for each concentric row from the center outwardly, and when the two burs are placed together, the abrupt faces 10 of the teeth of the opposing burs give a shearing cut for the side faces of the teeth. Moreover, as the material to be ground is introduced at the center, and is forced outwardly, the smaller teeth which do not interlock fully, first attack the material and the curvature of the transverse grooves follows more nearly the natural path of the flow of the grain. The teeth of each concentric row are all of exactly the same size, and a more uniform grade of grinding is the result. The cost of manufacture of the grinding disks is also very greatly cheapened. The disk is secured in fixed position for indexing on the center 6 and thereafter the disk itself does not have to be released until all the transverse grooves are cut and the cutting of the teeth is completed. Each tooth is accurately cut, and the teeth of the two coöperating disks, when placed together, fit together accurately to form the required cutting and grinding surfaces when the one disk is rotated on the other.

Having thus described my invention, what I claim as new and desire to secure by Letters Patent, is:—

1. A pair of coöperating disks for coffee mills and the like, provided with concentric rows of uniformly pyramidal teeth, the teeth of each concentric row being of uniform size and gradually and uniformly increasing in size for each radial row for both disks from the center to the periphery, with the radial faces of the teeth cut on the same arc of a circle eccentric of the center of the disk for each disk, the center of the cutting arc being uniformly advanced around the periphery of the disk for the radial rows of both disks.

2. A pair of coöperating disks for coffee mills and the like, provided with concentric rows of uniformly pyramidal teeth, the teeth of each concentric row being of uniform size and gradually and uniformly increasing in size for each radial row for both disks from the center to the periphery, with the radial faces of the teeth cut on the same arc of a circle eccentric of the center of the disk for each disk, the center of the cutting arc being uniformly advanced around the periphery of the disk for the radial rows of both disks, each tooth for each concentric row having an abrupt and an inclined V-shaped radial face, with similarly inclined side faces, whereby when the two disks are placed together the abrupt radial faces of the teeth will give a shearing cut with the side faces.

HERBERT L. JOHNSTON.

Attest:
E. E. EDGAR,
R. W. DEWEESE.